United States Patent
Hong

(10) Patent No.: US 12,312,453 B2
(45) Date of Patent: May 27, 2025

(54) POLYOL COMPOSITION, METHOD FOR PREPARING POLYURETHANE FOAM USING THE SAME, AND POLYURETHANE FOAM PREPARED BY THE METHOD

(71) Applicants: HYUNDAI MOTOR COMPANY, Seoul (KR); KIA CORPORATION, Seoul (KR)

(72) Inventor: Chae Hwan Hong, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/860,713

(22) Filed: Jul. 8, 2022

(65) Prior Publication Data

US 2023/0075299 A1   Mar. 9, 2023

(30) Foreign Application Priority Data

Jul. 20, 2021   (KR) .................. 10-2021-0094553

(51) Int. Cl.

| | |
|---|---|
| C08G 18/08 | (2006.01) |
| C08G 18/12 | (2006.01) |
| C08G 18/32 | (2006.01) |
| C08G 18/44 | (2006.01) |
| C08G 18/48 | (2006.01) |
| C08G 18/66 | (2006.01) |
| C08G 18/76 | (2006.01) |
| C08G 65/08 | (2006.01) |
| C08G 65/324 | (2006.01) |
| C08G 77/14 | (2006.01) |
| C08J 9/00 | (2006.01) |
| C08J 9/14 | (2006.01) |
| C08G 101/00 | (2006.01) |

(52) U.S. Cl.
CPC ............ *C08J 9/0061* (2013.01); *C08G 18/12* (2013.01); *C08G 18/14* (2013.01); *C08G 18/3206* (2013.01); *C08G 18/4808* (2013.01); *C08G 18/4833* (2013.01); *C08G 65/08* (2013.01); *C08G 65/3245* (2013.01); *C08G 77/14* (2013.01); *C08G 2101/00* (2013.01); *C08G 2110/005* (2021.01); *C08G 2110/0058* (2021.01); *C08J 2203/10* (2013.01); *C08J 2203/14* (2013.01); *C08J 2475/08* (2013.01)

(58) Field of Classification Search
None
See application file for complete search history.

(56) References Cited

U.S. PATENT DOCUMENTS

| | | | | |
|---|---|---|---|---|
| 4,282,331 | A | * 8/1981 | Priest | ............... C08G 18/638 521/137 |
| 5,447,965 | A | * 9/1995 | Eling | ............... C08G 18/4833 521/159 |
| 8,247,467 | B2 | 8/2012 | Mijolovic et al. | |
| 9,512,259 | B2 | 12/2016 | Allen et al. | |
| 10,106,641 | B2 | * 10/2018 | Klesczewski | ...... C08G 18/7621 |
| 2008/0058468 | A1 | 3/2008 | Younes | |
| 2009/0306239 | A1 | 12/2009 | Mijolovic et al. | |
| 2014/0066535 | A1 | * 3/2014 | Jacobs | ............... C08G 18/7671 521/159 |
| 2014/0234613 | A1 | * 8/2014 | Nefzger | ............ C08G 18/4261 428/319.7 |
| 2016/0115288 | A1 | 4/2016 | Waddington | |
| 2016/0177046 | A1 | 6/2016 | Torres et al. | |
| 2016/0264711 | A1 | * 9/2016 | Krebs | ................ C08G 18/14 |
| 2017/0044341 | A1 | 2/2017 | Klesczewski et al. | |
| 2018/0127536 | A1 | 5/2018 | Lindner et al. | |
| 2018/0265623 | A1 | 9/2018 | Klesczewski et al. | |
| 2018/0327537 | A1 | * 11/2018 | Gossner | ........... C08G 18/4887 |
| 2020/0325296 | A1 | 10/2020 | Waddington | |
| 2021/0002412 | A1 | * 1/2021 | Gossner | ............. C08G 18/222 |

FOREIGN PATENT DOCUMENTS

| | | | |
|---|---|---|---|
| JP | 2018503730 A | 2/2018 | |
| KR | 20090088377 A | 8/2009 | |
| KR | 101471663 B1 | 12/2014 | |
| KR | 20160006775 A | 1/2016 | |
| WO | WO-2019180156 A1 * | 9/2019 | ......... C08G 18/1833 |

OTHER PUBLICATIONS

Dong Hyun Lee et al., Carbon Dioxide Based Poly(ether carbonate) Polyol in Bi-polyol Mixtures for Rigid Polyurethane Foams, Journal of Polymers and the Environment, vol. 28, 2020; 9 pp.

* cited by examiner

*Primary Examiner* — Melissa A Rioja
(74) *Attorney, Agent, or Firm* — Lempia Summerfield Katz LLC

(57) ABSTRACT

Disclosed are a polyol composition using carbon dioxide, a method for preparing a polyurethane foam using the polyol composition, and a polyurethane foam prepared using the method. A method for preparing a polyurethane foam includes reacting isocyanate with a polyol composition containing a polyol compound having a synthetic polyol containing carbon dioxide, a chain extender, and a foaming agent.

12 Claims, No Drawings

POLYOL COMPOSITION, METHOD FOR PREPARING POLYURETHANE FOAM USING THE SAME, AND POLYURETHANE FOAM PREPARED BY THE METHOD

CROSS-REFERENCE TO RELATED APPLICATION

This application claims under 35 U.S.C. § 119(a) the benefit of priority to Korean Patent Application No. 10-2021-0094553, filed on Jul. 20, 2021, the entire contents of which are incorporated herein by reference.

BACKGROUND

(a) Technical Field

The present disclosure relates to a polyol composition using carbon dioxide, a method for preparing a polyurethane foam using the polyol composition, and a polyurethane foam prepared using the method. More particularly, the present disclosure relates to a method for preparing a polyurethane foam by reacting isocyanate with a polyol composition containing a polyol compound including a synthetic polyol containing carbon dioxide, a chain extender, and a foaming agent.

(b) Background Art

There is increasing interest in low-carbon automobile parts materials, and regulations pertaining thereto are becoming more stringent. Methods for realizing low-carbon automobile parts materials include emitting less carbon dioxide or incorporating carbon dioxide into a raw material in the process of synthesizing raw materials and polymers. Main raw materials for polyurethane, which is a principal ingredient of automobile interior materials, are polyols and isocyanates.

In the related art, methods for synthesizing low-carbon polyols and isocyanates have not been developed, so methods for synthesizing low-carbon polyurethane materials for automobile interior application have not been conceived.

Accordingly, there has been demand for development of a method for synthesizing a polyol containing carbon dioxide that overcomes the above problems, and a polyurethane composition for low-carbon automobile interior materials using the same.

The above information disclosed in this Background section is only to enhance understanding of the background. Therefore, the Background section may contain information that does not form the prior art that is already known in this country to a person of ordinary skill in the art.

SUMMARY

The present disclosure has been made in an effort to solve the above-described problems associated with the prior art, and it is one object of the present disclosure to provide a method for preparing a low-carbon polyurethane foam.

It is another object to provide a polyurethane foam having effects of providing both carbon reduction and stress relaxation.

It is another object to provide a polyurethane foam realizing carbon reduction and exhibiting excellent physical properties such as tensile strength, elongation, and bursting strength.

The objects of the present disclosure are not limited to those described above. Other objects may be understood from the following description and are able to be implemented by the methods and compositions defined in the claims and combinations thereof.

In one aspect, a polyol composition is disclosed. The polyol composition includes a polyol compound, a chain extender, and a foaming agent, wherein the polyol compound contains a base polyol and a synthetic polyol containing carbon dioxide ($CO_2$).

The base polyol may include a petroleum polyol, wherein the petroleum polyol may be a polyether polyol, a polyester polyol, or a combination thereof.

The synthetic polyol may be prepared by polymerizing a mixture of one or more of ethylene glycol, 1,2-propane glycol, 1,3-propylene glycol, butylene glycol, 1,6-hexanediol, 1,8-octanediol, neopentyl glycol, 2-methyl-1,3-propanediol, glycerol, trimethylolpropane, 1,2,3-hexanetriol, 1,2,4-butanetriol, or a derivative thereof with carbon dioxide and propylene oxide.

The base polyol may have a hydroxyl value in a range of 400 to 800 mg KOH/g and an average molecular weight in a range of 4,000 to 6,000 g/mol.

The synthetic polyol may have a hydroxyl value in a range of 400 to 800 mg KOH/g and an average molecular weight in a range of 4,000 to 6,000 g/mol.

The polyol compound may include 80 to 95% by weight of the base polyol and to 20% by weight of the synthetic polyol.

The chain extender may be present in an amount of 0.5 to 4 parts by weight based on 100 parts by weight of the polyol compound, and the foaming agent may be present in an amount of 2 to 35 parts by weight based on 100 parts by weight of the polyol compound.

The polyol composition may further contain an additive including at least one of a flame retardant and a cell stabilizer.

The flame retardant may be present in an amount of 0.5 to 3 parts by weight based on 100 parts by weight of the polyol compound, and the cell stabilizer may be present in an amount of 3 to 5 parts by weight based on 100 parts by weight of the polyol compound.

In another aspect, a method for preparing a polyurethane foam is provided. The method includes a primary reaction of mixing the polyol composition with a first isocyanate, followed by foaming, to prepare a primary reaction mixture. The method further includes a secondary reaction of mixing the primary reaction mixture with a second isocyanate to prepare a secondary reaction mixture.

In the primary reaction, the polyol composition is mixed with the first isocyanate at a temperature in a range of 20 to 45° C. Further, in the secondary reaction, the primary reaction mixture is mixed with the second isocyanate at a temperature in a range of 30 to 70° C.

In the primary reaction, the ratio of the hydroxyl group (—OH) of the polyol contained in the primary reaction mixture to the isocyanate group (—NCO) contained in the isocyanate may be in a range of 1:0.5 to 1:1.8.

In the secondary reaction, the ratio of the hydroxyl group (—OH) of the polyol contained in the secondary reaction mixture to the isocyanate group (—NCO) contained in the isocyanate may be in a range of 1:0.3 to 1:1.

In the primary reaction, the first isocyanate may be used in an amount of 20 to 60 parts by weight based on 100 parts by weight of the polyol composition. Further, in the secondary reaction, the second isocyanate may be used in an amount of 20 to 60 parts by weight based on 100 parts by weight of the primary reaction mixture.

In another aspect, a polyurethane foam prepared by the method described above is disclosed.

Other aspects and embodiments of the disclosure are provided herein.

DETAILED DESCRIPTION

The objects described above, as well as other objects, features, and advantages, may be understood from the following embodiments with reference to the attached drawings. However, the present disclosure is not limited to the embodiments, and may be embodied in different forms. The embodiments are suggested only to offer a thorough and complete understanding of the disclosed context and to sufficiently inform those skilled in the art of the technical concept of the present disclosure.

The terms "comprise" and/or "has", when used in this specification, specify the presence of stated features, integers, steps, operations, elements, components, or combinations thereof. Such terms do not preclude the presence or addition of one or more other features, integers, steps, operations, elements, components, or combinations thereof. In addition, when an element such as a layer, film, region, or substrate is referred to as being "on" another element, it may be directly on the other element, or an intervening element may also be present. Further, when an element such as a layer, film, region, or substrate is referred to as being "under" another element, it may be directly under the other element, or an intervening element may also be present.

Unless the context clearly indicates otherwise, all numbers, figures, and/or expressions that represent ingredients, reaction conditions, polymer compositions, and amounts of mixtures used in the specification are approximations that reflect various uncertainties of measurement occurring inherently in obtaining these figures, among other things. For this reason, in all cases, the term "about" should be understood to modify all numbers, figures, and/or expressions. In addition, when numerical ranges are disclosed in the description, these ranges are continuous, and include all numbers from the minimum to the maximum, including the maximum within each range, unless otherwise defined. Furthermore, when the range refers to an integer, it includes all integers from the minimum to the maximum, including the maximum within the range, unless otherwise defined.

In the specification, when a range is referred to regarding a parameter, the parameter encompasses all figures including end points disclosed within the range. For example, the range of "5 to 10" includes figures of 5, 6, 7, 8, 9, and 10, as well as arbitrary sub-ranges, such as ranges of 6 to 10, 7 to 10, 6 to 9, and 7 to 9, and any figures, such as 5.5, 6.5, 7.5, 5.5 to 8.5, and 6.5 to 9, between appropriate integers that fall within the range. In addition, for example, the range of "10% to 30%" encompasses all integers that include numbers such as 10%, 11%, 12%, and 13%, as well as 30%, and any sub-ranges, such as 10% to 15%, 12% to 18%, or 20% to 30%, as well as any numbers, such as 10.5%, 15.5%, and 25.5%, between appropriate integers that fall within the range.

As recent technological competition for carbon reduction has arisen in the global automobile manufacturing technology, eco-friendly automobile interior materials have been demanded, and investment in such technology is being made. Against this background, by controlling the ingredients of a polyurethane composition used as an automobile interior material, the composition for realizing a low-carbon material and a method for preparing the same have been disclosed.

The present disclosure relates to a polyol composition for automobile parts using carbon dioxide, a method for preparing a polyurethane foam using the same, and a polyurethane foam prepared using the method.

Hereinafter, each ingredient contained in the polyol composition and each step of the method for preparing the polyurethane foam using the polyol composition are described in detail below.

Polyol Composition

The polyol composition contains a polyol compound, a chain extender, and a foaming agent.

Polyol Compound

The polyol compound includes a base polyol and a synthetic polyol containing carbon dioxide ($CO_2$). More specifically, the polyol compound includes 80 to 95% by weight of the base polyol and 5 to 20% by weight of the synthetic polyol.

The base polyol includes a petroleum polyol. The petroleum polyol is a polyether polyol, a polyester polyol, or a combination thereof.

The polyether polyol may be prepared by polymerizing a mixture of one or more of ethylene glycol, 1,2-propane glycol, 1,3-propylene glycol, butylene glycol, 1,6-hexanediol, 1,8-octanediol, neopentyl glycol, 2-methyl-1,3-propanediol, glycerol, trimethylolpropane, 1,2,3-hexanetriol, 1,2,4-butanetriol, or derivatives thereof with a mixture of one or more of carbon dioxide, propylene oxide, or derivatives thereof.

The base polyol may be a polyether polyol having high processability and excellent stability to hydrolysis due to low viscosity.

The base polyol may have a hydroxyl value of 400 to 800 mg KOH/g and an average molecular weight of 4,000 to 6,000 g/mol.

The synthetic polyol may be prepared by polymerizing a mixture of one or more of ethylene glycol, 1,2-propane glycol, 1,3-propylene glycol, butylene glycol, 1,6-hexanediol, 1,8-octanediol, neopentyl glycol, 2-methyl-1,3-propanediol, glycerol, trimethylolpropane, 1,2,3-hexanetriol, 1,2,4-butanetriol, or derivatives thereof, a mixture of one or more of ethylene oxide, propylene oxide, or derivatives thereof, and carbon dioxide ($CO_2$).

The synthetic polyol may include a compound represented by the following Formula 1.

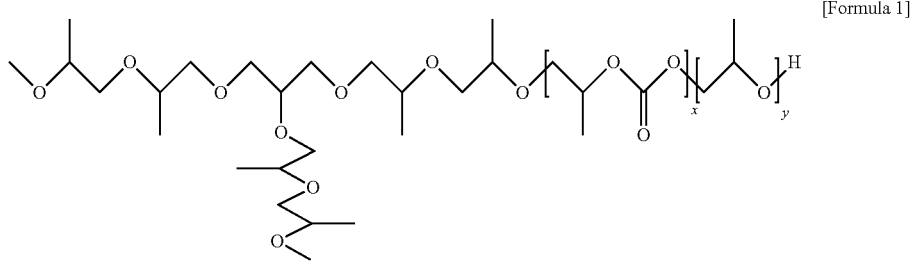

[Formula 1]

The synthetic polyol may include 8 to 15% of carbon dioxide in the molecular structure thereof, and the carbon dioxide improves the stiffness of the material.

The synthetic polyol may have a hydroxyl value of 400 to 800 mg KOH/g and an average molecular weight of 4,000 to 6,000 g/mol.

Chain Extender

The chain extender serves to increase the molecular weight of the polyurethane by extending or crosslinking the polyurethane chain.

The chain extender includes a diol, triol, tetraol, diamine, aminoalcohol, or combinations thereof.

The diol may include ethylene glycol, propylene glycol, 1,4-butanediol, or combinations thereof.

The triol may include glycerin.

The tetraol may include pentaerythritol.

The diamine may include hexa-methylene diamine, triethylenediamine, tetraethylenediamine, tetramethylethylenediamine, m-phenylene diamine, or combinations thereof.

The chain extender may be present in an amount of 0.5 to 4 parts by weight based on 100 parts by weight of the polyol compound. In this case, when the chain extender is added in an amount of less than 0.5 parts by weight, the structure of the final material is unstable and mechanical properties are deteriorated, and when the chain extender is added in an amount of more than 4 parts by weight, regional differences in physical properties occur due to crosslinking.

Foaming Agent

The foaming agent may include at least one of cyclopentane and water ($H_2O$).

The water reacts with isocyanate to release carbon dioxide ($CO_2$) while forming urea, and carbon dioxide causes polyurethane to foam. Water is excellent from the aspects of price and environmental friendliness, but has a disadvantage in that the selection of raw materials and the range of the amount of the added foaming agent are limited in order to control the density and hardness of polyurethane due to excessively high amount of heating and increased viscosity during the reaction of forming polyurethane.

Cyclopentane is an inexpensive and environmentally friendly foaming agent and has advantages of causing no environmental pollution such as ozone depletion and global warming, of facilitating preparation of the polyurethane foam composition due to the low evaporation temperature, and of providing excellent flowability in the preparation of the polyurethane foam due to the low viscosity.

The foaming agent may include both cyclopentane and water. In this case, it is possible to obtain the advantages of cyclopentane and to prevent the increased density of the polyurethane foam and the high heating amount, which is the disadvantage of water as a foaming agent.

The foaming agent may include 60 to 80% by weight of cyclopentane and 20 to 40% by weight of water.

The foaming agent may be present in an amount of 2 to 35 parts by weight based on 100 parts by weight of the polyol compound.

Additive

The polyol composition may further contain an additive including at least one of a flame retardant and a cell stabilizer.

The flame retardant is generally added to improve the low flame retardancy of polyurethane, and is classified into reactive flame retardants and additive flame retardants, and may be broadly classified into halogen-based flame retardants, phosphorus-based flame retardants, and inorganic flame retardants. There is no limitation as to the specific type of flame retardant in the present disclosure. The flame retardant may be halogen-based, phosphorus-based, or inorganic flame retardants may be selected and used.

The flame retardant is present in an amount of 0.5 to 3 parts by weight based on 100 parts by weight of the polyol compound. In this case, when the amount of the flame retardant is less than 0.3 parts by weight, there is a problem in that it does not meet the flame retardance standards for automobile interior materials, and when the amount thereof is higher than 3 parts by weight, discoloration of the final product may occur due to treatment with the excessive flame retardant.

The cell stabilizer serves to form small and uniform cells during formation of foam by foaming when forming a polyurethane foam. The cell stabilizer may include cationic surfactants, anionic surfactants, organosilicon surfactants, silicone-based surfactants, and the like. In the present disclosure, any one selected therefrom may be used. In certain examples, the cell stabilizer may be at least one of polysiloxane ether or polysiloxane ester, which are silicone surfactants.

The cell stabilizer is present in an amount of 3 to 5 parts by weight based on 100 parts by weight of the polyol compound. When the cell stabilizer is present in an amount less than 3 parts by weight, there is a problem in that the uniformity of the cell structure of the final foam is not controlled, and when the cell stabilizer is present in an amount of higher than 5 parts by weight, there is a problem in that costs increase due to excessive surfactant treatment.

Polyurethane Foam Preparation Method

The method for preparing a polyurethane foam includes a primary reaction of mixing the polyol composition with a first isocyanate, followed by foaming, to prepare a primary reaction mixture, and a secondary reaction of mixing the primary reaction mixture with a second isocyanate to prepare a secondary reaction mixture.

That is, the present disclosure is characterized in that the isocyanate primarily and secondarily reacts with the polyol in two respective steps. This aims to uniformize the distribution of a hard segment and a soft segment in the polyurethane structure.

Primary Reaction

In this step, the polyol composition is mixed with a first isocyanate, followed by foaming, to prepare a primary reaction mixture. More specifically, a polyol composition containing a polyol compound including a base polyol and a synthetic polyol, a chain extender, and a foaming agent reacts with the first isocyanate to prepare a primary reaction mixture.

The mixing may be carried out at a temperature in a range of 20 to 45° C. Here, when the mixing is performed at a temperature lower than 20° C., the reaction does not occur well. When the mixing is performed at a temperature higher than 45° C., there may be a problem in that mixing enabling an internal density to be homogeneous is impossible due to the excessively high reaction rate.

The first isocyanate may be monoisocyanate, diisocyanate, or the like. In certain examples, diisocyanate is used.

The diisocyanate may be toluene diisocyanate (hereinafter referred to as "TDI"), monomeric 4,4'-diphenylmethane diisocyanate, monomeric 2,4'-diphenylmethane diisocyanate, 2,2'-diphenylmethane diisocyanate, polymeric 4,4'-diphenylmethane diisocyanate, polymeric 2,4'-diphenylmethane diisocyanate, polymeric 2,2'-diphenylmethane diisocyanate, torilene diisocyanate, or derivatives thereof. Hereinafter, the monomeric or polymeric diphenylmethane diisocyanate and derivatives thereof are defined as "MDI".

The first isocyanate may be used in an amount of 20 to 60 parts by weight, (e.g., 30 to 50 parts by weight), based on 100 parts by weight of the polyol composition. Here, when the amount of the first isocyanate is less than 20 parts by weight, there may be a problem in that the hardness of the final material is deteriorated. When the amount is higher than 60 parts by weight, there may be a problem in that appropriate elasticity cannot be realized due to the excessive increase in hardness.

The ratio of the hydroxyl group (—OH) of the polyol contained in the primary reaction mixture to the isocyanate group (—NCO) contained in the isocyanate may be in a range of 1:0.5 to 1:1.8, (e.g., 1:0.7 to 1:1.6). Here, when the ratio is less than 1:0.5, there are problems in that the polyol component is present in an excessive amount. Thus, the surface of the polyurethane foam product that is subsequently formed is severely sticky due to the high viscosity thereof and unreacted polyol remains in the product. Further, when the ratio is higher than 1:1.8, there are problems in that the polyurethane composition is excessively rigid. Thus, the product is difficult to mold and easily broken.

Secondary Reaction

In this step, a second reaction mixture is prepared by mixing the primary reaction mixture with a second isocyanate.

The second isocyanate may be the same as or different from the first isocyanate, and the selection thereof may vary depending on the purpose of preparation and environmental considerations.

The mixing may be carried out at a temperature in a range of 30 to 70° C. At this time, when the temperature is less than 30° C., there is a problem in that the chemical reaction is excessively slow. When the temperature is higher than 70° C., the foaming is excessively quickly performed by the foaming agent. Thus, the foam is instantaneously torn, or a large amount of foaming gas may instantaneously escape, causing a problem in which a large hole is formed in the center of the foam. By performing the primary and secondary reactions at different reaction temperatures, it is possible to evenly distribute the internal density of the composition and thereby produce a polyurethane foam having improved physical properties compared to the conventional art.

The second isocyanate may be used in an amount of 20 to 60 parts by weight, (e.g., 30 to 50 parts by weight), based on 100 parts by weight of the primary reaction mixture. In this case, when the second isocyanate is present in an amount less than 20 parts by weight, there is a problem in that the hardness of the final material is deteriorated. When the second isocyanate is present in an amount greater than 60 parts by weight, there may be a problem in that appropriately elasticity cannot be realized due to the excessively increased hardness.

The ratio of the hydroxyl group (—OH) of the polyol contained in the secondary reaction mixture to the isocyanate group (—NCO) contained in the isocyanate may be in a range of 1:0.3 to 1:1, (e.g., 1:0.4 to 1:0.5). In this case, when the ratio is lower than 1:0.3, there is a problem in that the mechanical properties of the final product are deteriorated due to the excess polyol components. When the ratio is higher than 1:1, there is a problem in that the final product is excessively rigid due to the excessive isocyanate content.

Polyurethane Foam

The polyurethane prepared by the method for preparing the polyurethane may have a density in a range of 30 to 140 $kg/m^3$.

Hereinafter, the present disclosure is described in more detail with reference to specific examples. The following examples are provided only for better understanding of the present disclosure, and thus should not be construed as limiting the scope of the present disclosure.

Example 1

450 g of petroleum polyether polyol, 50 g of polyol containing carbon dioxide, 5 g of a chain extender, 15 g of cyclopentane as a foaming agent, 4.5 g of water, and 7.5 g of polysiloxane ether as a cell stabilizer were mixed at 1 atm and at a temperature in a range of 30 to 32° C. to prepare a polyol resin premix. 130 g of 4,4'-diphenylmethane diisocyanate (MDI) was added to the polyol resin premix, followed by mixing while stirring at 500 to 700 rpm using a stirrer to induce a primary reaction between the polyol of the polyol resin premix and the MDI to thereby prepare a primary reaction mixture. 70 g of 4,4'-diphenylmethane diisocyanate (MDI) was added to the first reaction mixture at 1 atm and at a temperature in a range of 45 to 47° C., and was then mixed while stirring at 700 to 800 rpm using a stirrer to prepare a secondarily reacted polyurethane composition, and the ingredients for the composition and the composition ratio are shown in Table 1 below.

Examples 2 to 7

Polyurethane compositions were prepared in the same manner as in Example 1, except that the ingredients for the composition and the composition ratio shown in Table 1 below were satisfied.

Example 8

A polyurethane composition was prepared using the same ingredients and composition ratios as in Example 1, except that the primary reaction was carried out at a temperature in a range of 21 to 23° C. and the secondary reaction was carried out at a temperature in a range of 35 to 37° 0.

TABLE 1

| Item (Unit: parts by weight) | | | Ex. 1 | Ex. 2 | Ex. 3 | Ex. 4 | Ex. 5 | Ex. 6 | Ex. 7 | Ex. 8 |
|---|---|---|---|---|---|---|---|---|---|---|
| Polyol compound | Polyol compound | Base polyol* | 98 | 96 | 95 | 98 | 96 | 95 | 98 | 96 |
| | | Synthetic polyol* | 2 | 4 | 5 | 2 | 4 | 5 | 2 | 4 |
| | | Total | \multicolumn{8}{l}{100 parts by weight} |
| | Chain extender | Propylene glycol* | 3 | 3 | 3 | 4 | 4 | 4 | 5 | 5 |
| | Foaming agent | Cyclopentane* | 4 | 4 | 10 | 12 | 4 | 2.5 | 2.5 | 20 |
| | | Water | 1 | 1 | 2 | 4 | 4 | 3 | 1 | 4 |
| | Flame retardant | Inorganic flame retardant | — | — | — | — | 1.5 | 1.5 | 1.5 | 1.5 |
| | Cell stabilizer | Polysiloxane ether* | 1.5 | 1.5 | 1.5 | 1.5 | 1 | 1 | 2 | 1.5 |
| Isocyanate | 4,4'-diphenylmethane diisocyanate(MDI)* | | 40 | 40 | 40 | 40 | 40 | 40 | 40 | 40 |
| | Toluene diisocyanate (TDI)* | | 10 | 10 | 10 | 10 | 10 | 10 | 10 | 10 |

*Base polyol: polyether polyol (FA-702, Korea Polyol Co., Ltd.)
*Propylene glycol: (Sigma-Aldrich)
*Cyclopentane: (Sigma-Aldrich)
*Polysiloxane ether: (DABCO DC-193, Air Product)
*MDI: (Lupranate MS, BASF)
*TDI: (LUPRANATE T80, BASF)
*Synthetic polyol: 120 g of polypropylene glycol was fed to a 20 L high-pressure reactor, 100 g of PO (propylene oxide) was fed through a tube, and then carbon dioxide was injected through a gas valve until the pressure inside the reactor reached 30 bar. The reactor was air-tightly sealed, the temperature was raised to 105° C., and the reaction was performed. The reaction was performed for 3 hours, and PO was added in an amount of 1 kg per hour during the reaction. The synthetic polyol obtained after the reaction contained about 15 wt % of carbon dioxide in the molecular structure thereof.

Comparative Examples 1 to 8

Polyurethane compositions to which a polyol containing carbon dioxide was not applied were prepared by performing the same method as in Examples 1 to 8, but having the compositions shown in Table 2 below.

TABLE 2

| | | | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|---|---|
| Polyol compound | Polyol compound | Base polyol* | 100 | 100 | 100 | 100 | 100 | 100 | 100 |
| | | Synthetic polyol* | — | — | — | — | — | — | — |
| | | Total | \multicolumn{7}{l}{100 parts by weight} |
| | Chain extender | Propylene glycol* | 3 | 3 | 3 | 4 | 4 | 4 | 5 |
| | Foaming agent | Cyclopentane* | 4 | 4 | 10 | 12 | 4 | 2.5 | 2.5 |
| | | Water | 1 | 1 | 2 | 4 | 4 | 3 | 1 |
| | Flame retardant | Inorganic flame retardant | — | — | — | — | 1.5 | 1.5 | 1.5 |
| | Cell stabilizer | polysiloxane ether* | 1.5 | 1.5 | 1.5 | 1.5 | 1 | 1 | 2 |
| Isocyanate | 4,4'-diphenylmethane diisocyanate (MDI)* | | 40 | 40 | 40 | 40 | 40 | 40 | 40 |
| | Toluene diisocyanate (TDI)* | | 10 | 10 | 10 | 10 | 10 | 10 | 10 |

*Base polyol: Polyether polyol (FA-702, Korea Polyol Co., Ltd.)
*Propylene glycol: (Sigma-Aldrich)
*Cyclopentane: (Sigma-Aldrich)
*Polysiloxane ether: (DABCO DC-193, Air Product)
*MDI: (Lupranate MS, BASF)
*TDI: (LUPRANATE T80, BASF)
*Synthetic polyol: 120 g of polypropylene glycol was fed to a 20 L high-pressure reactor, 100 g of PO (propylene oxide) was fed through a tube, and then carbon dioxide was injected through a gas valve until the pressure inside the reactor reached 30 bar. The reactor was air-tightly sealed, the temperature was raised to 105° C., and the reaction was performed.
The reaction was performed for 3 hours, and PO was added in an amount of 1 kg per hour during the reaction. The synthetic polyol obtained after the reaction contained about 15 wt % of carbon dioxide in the molecular structure thereof.

Experimental Example

In order to measure the physical properties of the polyurethanes prepared in Examples and Comparative Examples, each experiment was performed according to the method shown in Table 3 below, and the results are shown in Table 4 below. In Table 4, Examples 1 to 8 and Comparative Examples 1 to 7 correspond to Experimental Examples 1-1 to 1-8 and Comparative Experimental Examples 1-1 to 1-7, respectively.

TABLE 3

| Item | Test method |
|---|---|
| Compressive strength | Evaluated in accordance with KS M 3808 |
| Bending strength | Evaluated in accordance with KS B 0801 |
| Tensile strength | Evaluated in accordance with ASTM D638 |
| Compression Hardness | Evaluated in accordance with KS M 3015 |
| Density | Evaluated in accordance with JIS K-6301 |
| Burst strength | Evaluated in accordance with ASTM D3574 |
| Ball elasticity | Evaluated in accordance with JIS K-6 |
| Stress relaxation* | Evaluated in accordance with self-evaluation method of finished automobiles |

*Stress relaxation evaluation: a specimen with a width, length, and thickness of 50 mm × 25 mm × 40 mm was prepared, placed on a test table, and pressed using a pressing plate. After pressing twice with a force of 2 kgf at a rate of 100 mm/min, the load was removed at the same rate to restore the initial thickness.
Immediately after the second load was removed, the test specimen was pressed with a force of 2 kgf to at a rate of 100 mm/min, the displacement was maintained for 2 hours, and a load-time curve was drawn. After 2 hours, the stress relaxation (%) was calculated using the following formula:
Stress relaxation (%) = [(initial load − load after 2 hours) × 100]/initial load

TABLE 4

| Item | Average density (kg/m$^3$) | Stress relaxation (%) | Tensile strength (kg/cm$^2$) | Elongation (%) | Burst strength (kg/cm) | Ball elasticity (%) |
|---|---|---|---|---|---|---|
| Experimental Example 1-1 | 42.4 | 29.4 | 1.02 | 107 | 0.53 | 66 |
| Experimental Example 1-2 | 42.8 | 27.5 | 1.06 | 110 | 0.54 | 66 |
| Experimental Example 1-3 | 42.7 | 27.8 | 1.15 | 111 | 0.55 | 66 |
| Experimental Example 1-4 | 42.5 | 29.6 | 1.02 | 106 | 0.53 | 66 |
| Experimental Example 1-5 | 42.5 | 27.4 | 1.06 | 119 | 0.54 | 66 |
| Experimental Example 1-6 | 42.6 | 27.7 | 1.14 | 111 | 0.55 | 66 |
| Experimental Example 1-7 | 42.6 | 29.6 | 1.06 | 108 | 0.53 | 66 |
| Experimental Example 1-8 | 42.6 | 27.4 | 1.09 | 110 | 0.54 | 66 |
| Comparative Experimental Example 1-1 | 42.5 | 30.8 | 1.02 | 105 | 0.52 | 66 |
| Comparative Experimental Example 1-2 | 42.9 | 30.7 | 1.02 | 106 | 0.51 | 66 |
| Comparative Experimental Example 1-3 | 42.6 | 30.7 | 1.03 | 105 | 0.52 | 66 |
| Comparative Experimental Example 1-4 | 42.4 | 30.8 | 1.05 | 104 | 0.52 | 66 |
| Comparative Experimental Example 1-5 | 42.6 | 30.6 | 1.02 | 105 | 0.51 | 66 |
| Comparative Experimental Example 1-6 | 42.7 | 30.7 | 1.03 | 104 | 0.52 | 66 |
| Comparative Experimental Example 1-7 | 42.5 | 30.8 | 1.04 | 106 | 0.53 | 66 |

As can be seen from the experimental examples above, in the examples in which the polyol containing carbon dioxide was added, the stress relaxation (%) was low in terms of physical properties. This means that when an external force is applied to the polyurethane, the tendency of the polyurethane to return to the original initial shape was high. Polyurethane carbon is elastic and is thus deformed upon receiving an external force. As the deformation occurs, initial comfort is given to the subject who applied the external force thereto, for example, the human body, and the tendency to return to the original state gives a sense of comfort over time. This restoring property is conventionally required of an elastic body, but new technology to add such a property is very important.

The present disclosure is characterized in that the composition to which a polyol containing carbon dioxide is added exhibits novel properties not found in conventional petroleum-based material formulations.

There is often a trade-off phenomenon in which, when a superior physical property is expressed, a deterioration in other physical properties occurs. The present disclosure is also characterized in that the composition avoids a trade-off between tensile properties and elastic properties.

As is apparent from the foregoing, the present disclosure is capable of providing a method for preparing a low-carbon polyurethane foam.

The present disclosure is capable of providing a polyurethane foam having effects of providing both carbon reduction and stress relaxation.

The present disclosure is capable of providing a polyurethane foam realizing carbon reduction and exhibiting excellent physical properties such as tensile strength, elongation, and bursting strength.

The effects of the present disclosure are not limited to those mentioned above. It should be understood that the effects of the present disclosure include all effects that can be inferred from the description of the present disclosure.

The present disclosure has been described in detail with reference to embodiments thereof. It should be appreciated by those skilled in the art that changes may be made in these examples without departing from the principles and spirit of the present disclosure, the scope of which is defined in the appended claims and their equivalents.

What is claimed is:

1. A polyol composition comprising:
a polyol component;
a chain extender;
a foaming agent; and
a cell stabilizer,
wherein the polyol component includes a base polyol and a synthetic polyol,
wherein the synthetic polyol is prepared by polymerizing a mixture of polypropylene glycol, propylene oxide, and carbon dioxide,
wherein the synthetic polyol comprises 8% by weight to 15% by weight of carbon dioxide,
wherein the synthetic polyol has an average molecular weight of 4,000 to 6,000 g/mol,
wherein the polyol component includes the synthetic polyol in a specific weight percent of 2 wt %, 4 wt %, or 5 wt %, and includes the base polyol as a remaining amount,
wherein the cell stabilizer is present in a specific parts by weight (pbw) of 1 pbw, 1.5 pbw, or 2 pbw, based on 100 parts by weight of the polyol component, and
wherein the synthetic polyol includes a derived structure of the polypropylene glycol represented by Formula 1' below:

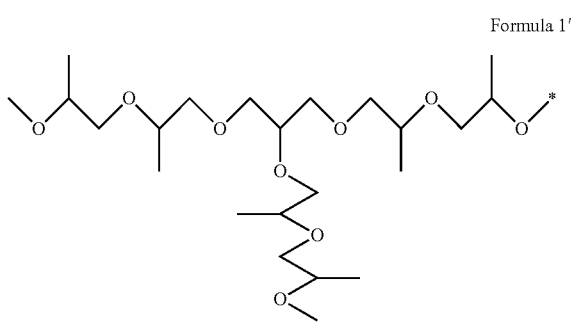 [SMILES: *OC(C)COC(C)COCC(COCC(C)OCC(C)OC)OCC(C)OCC(C)OC]

Formula 1' wherein * is attached to a structure derived from propylene oxide and carbon dioxide.

2. The polyol composition of claim 1, wherein the base polyol comprises at least one petroleum polyol selected from the group consisting of a polyether polyol, a polyester polyol, and a combination thereof.

3. The polyol composition of claim 1, wherein the base polyol has an average molecular weight in a range of 4,000 g/mol to 6,000 g/mol.

4. The polyol composition of claim 1, wherein:
the chain extender is present in an amount of 0.5 parts by weight to 4 parts by weight based on 100 parts by weight of the polyol component; and
the foaming agent is present in an amount of 2 parts by weight to 35 parts by weight based on 100 parts by weight of the polyol component.

5. The polyol composition of claim 1, further comprising:
a flame retardant.

6. The polyol composition of claim 5, wherein:
the flame retardant is present in an amount of 0.5 parts by weight to 3 parts by weight based on 100 parts by weight of the polyol component.

7. A method for preparing a polyurethane foam, the method comprising:
mixing and reacting, in a primary reaction, a polyol composition with a first isocyanate, followed by foaming, to provide a primary reaction mixture; and
mixing and reacting, in a secondary reaction, the primary reaction mixture with a second isocyanate to provide a secondary reaction mixture,
wherein the polyol component includes a polyol component having a base polyol and a synthetic polyol, a chain extender, a foaming agent, and a cell stabilizer,
wherein the synthetic polyol is prepared by polymerizing a mixture of polypropylene glycol, propylene oxide and carbon dioxide,
wherein the synthetic polyol includes 8% by weight to 15% by weight of carbon dioxide,
wherein the synthetic polyol has an average molecular weight of 4,000 to 6,000 g/mol,
wherein the polyol component includes the synthetic polyol in a specific weight percent of 2 wt %, 4 wt %, or 5 wt %, and includes the base polyol as a remaining amount,
wherein the cell stabilizer is present in a specific parts by weight (pbw) of 1 pbw, 1.5 pbw, or 2 pbw, based on 100 parts by weight of the polyol component, and
wherein the synthetic polyol includes a derived structure of the polypropylene glycol represented by Formula 1' below:

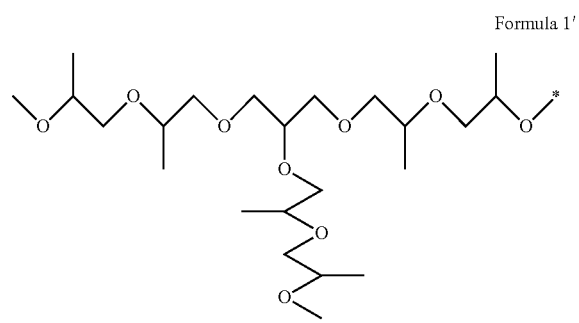 [SMILES: *OC(C)COC(C)COCC(COCC(C)OCC(C)OC)OCC(C)OCC(C)OC]

Formula 1' wherein * is attached to a structure derived from propylene oxide and carbon dioxide.

8. The method of claim 7, wherein:
in the primary reaction, the polyol composition is mixed with the first isocyanate at a temperature in a range of 20° C. to 45° C.; and
in the secondary reaction, the primary reaction mixture is mixed with the second isocyanate at a temperature in a range of 30° C. to 70° C.

9. The method of claim 7, wherein, in the primary reaction, a ratio of all hydroxyl groups (—OH) of the base polyol and the synthetic polyol contained in the primary reaction mixture to all isocyanate (—NCO) groups contained in the first isocyanate is in a range of 1:0.5 to 1:1.8.

10. The method of claim 7, wherein, in the secondary reaction, a ratio of all hydroxyl groups (—OH) of the base polyol and the synthetic polyol contained in the secondary reaction mixture to all isocyanate (—NCO) groups contained in the second isocyanate is in a range of 1:0.3 to 1:1.

11. The method of claim 7, wherein:
in the primary reaction, the first isocyanate is used in an amount of 20 parts by weight to 60 parts by weight based on 100 parts by weight of the polyol composition; and in the secondary reaction, the second isocyanate is used in an amount of 20 parts by weight to 60 parts by weight based on 100 parts by weight of the primary reaction mixture.

12. A polyurethane foam prepared by a reaction of components comprising:
a polyol composition having a polyol component including comprising—a base polyol and a synthetic polyol, a chain extender, a foaming agent, and a cell stabilizer;
a first isocyanate; and
a second isocyanate,
wherein the polyol composition has been mixed with the first isocyanate, followed by a foaming, to provide a primary reaction mixture,
wherein the primary reaction mixture has been mixed with the second isocyanate to provide the polyurethane foam,
wherein the synthetic polyol is prepared by polymerizing a mixture of polypropylene glycol, propylene oxide and carbon dioxide,
wherein the synthetic polyol comprises 8% by weight to 15% by weight of carbon dioxide,
wherein the synthetic polyol has an average molecular weight of 4,000 to 6,000 g/mol,
wherein the polyol component includes the synthetic polyol in a specific weight percent of 2 wt %, 4 wt %, or 5 wt %, and includes the base polyol as a remaining amount,
wherein the cell stabilizer is present in a specific parts by weight (pbw) of 1 pbw, 1.5 pbw, or 2 pbw, based on 100 parts by weight of the polyol component, and
wherein the synthetic polyol includes a derived structure of the polypropylene glycol represented by Formula 1' below:

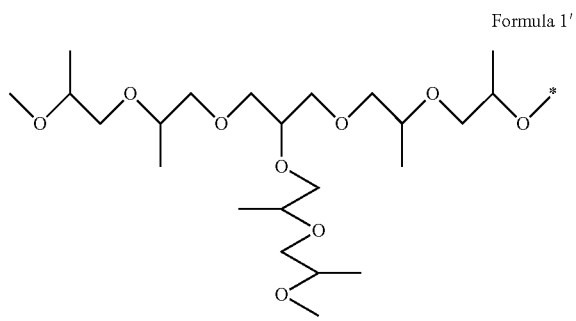 [SMILES: *OC(C)COC(C)COCC(COCC(C)OCC(C)OC)OCC(C)OCC(C)OC]

Formula 1' wherein * is attached to a structure derived from propylene oxide and carbon dioxide.

* * * * *